Dec. 9, 1924.
M. P. DOUGHERTY
STRAW SPREADER
Filed May 5, 1922
1,518,573
4 Sheets-Sheet 1
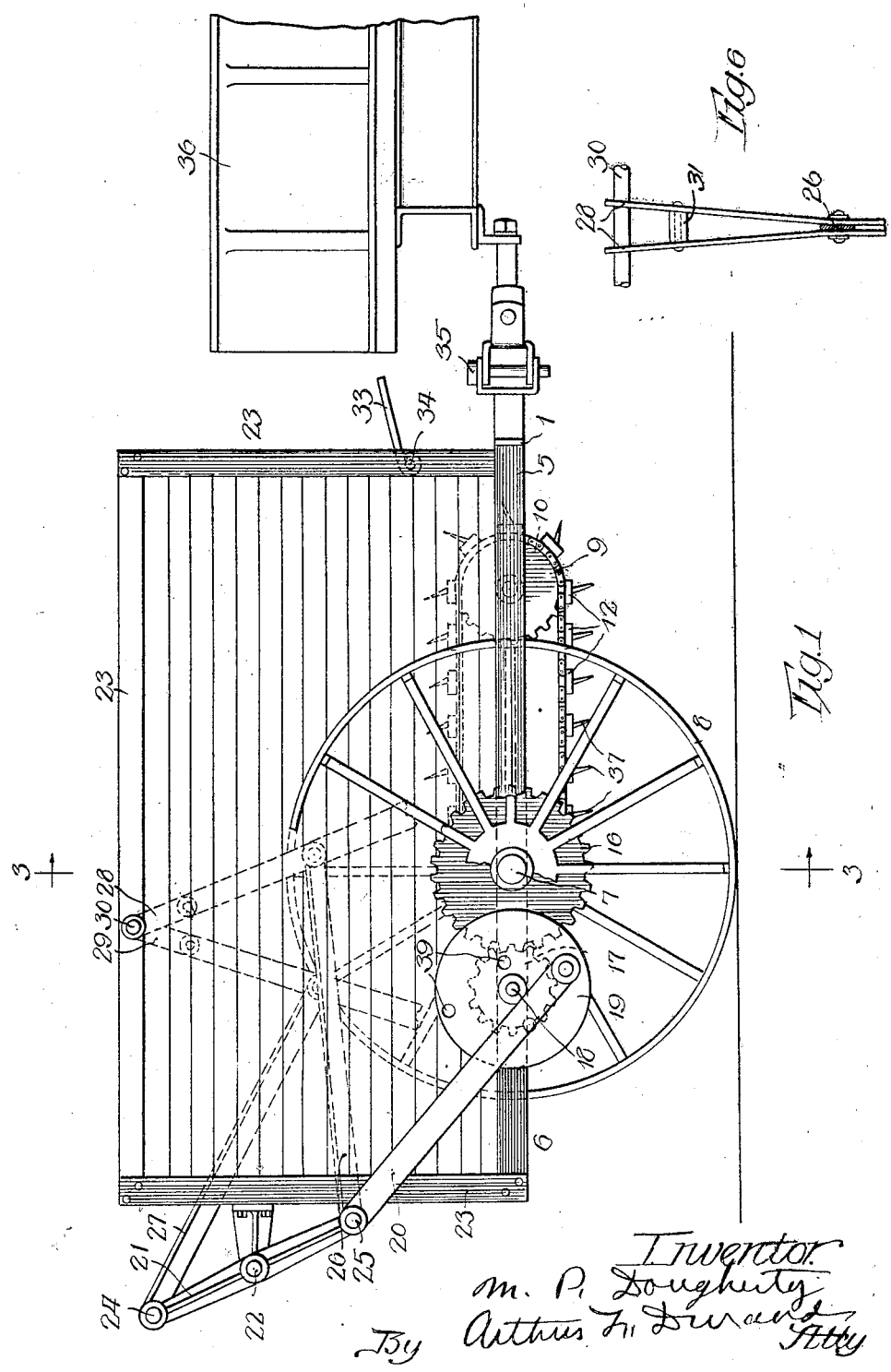

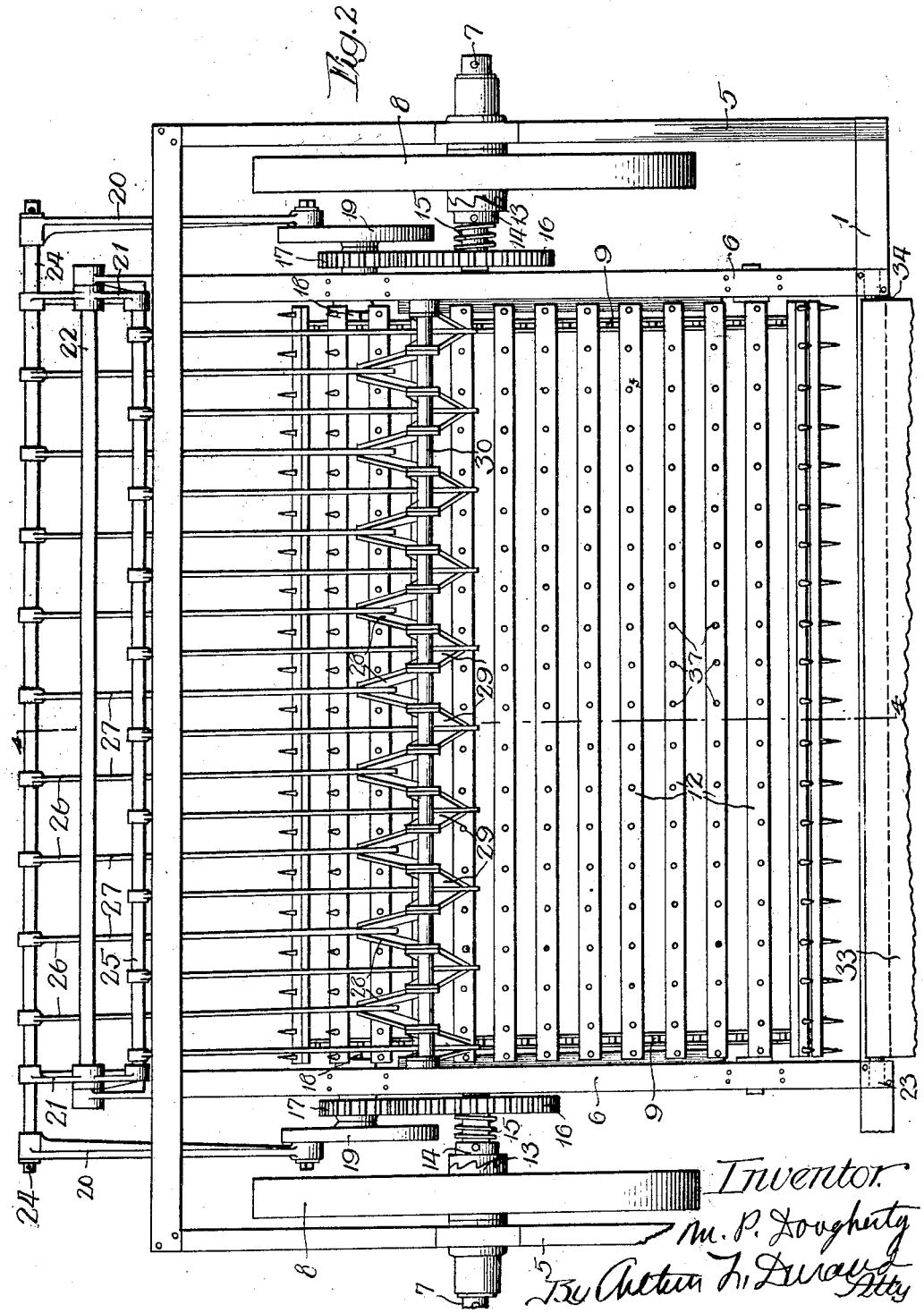

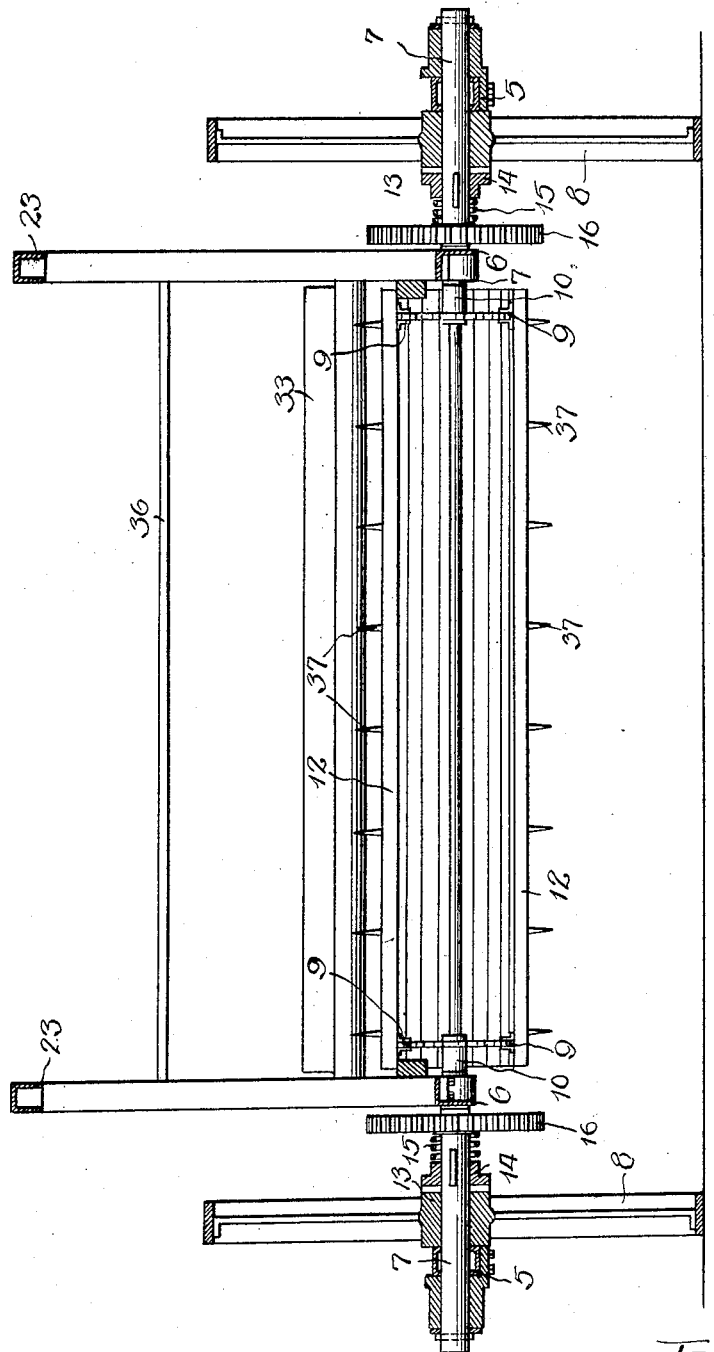

Dec. 9, 1924. 1,518,573
M. P. DOUGHERTY
STRAW SPREADER
Filed May 5, 1922  4 Sheets-Sheet 4
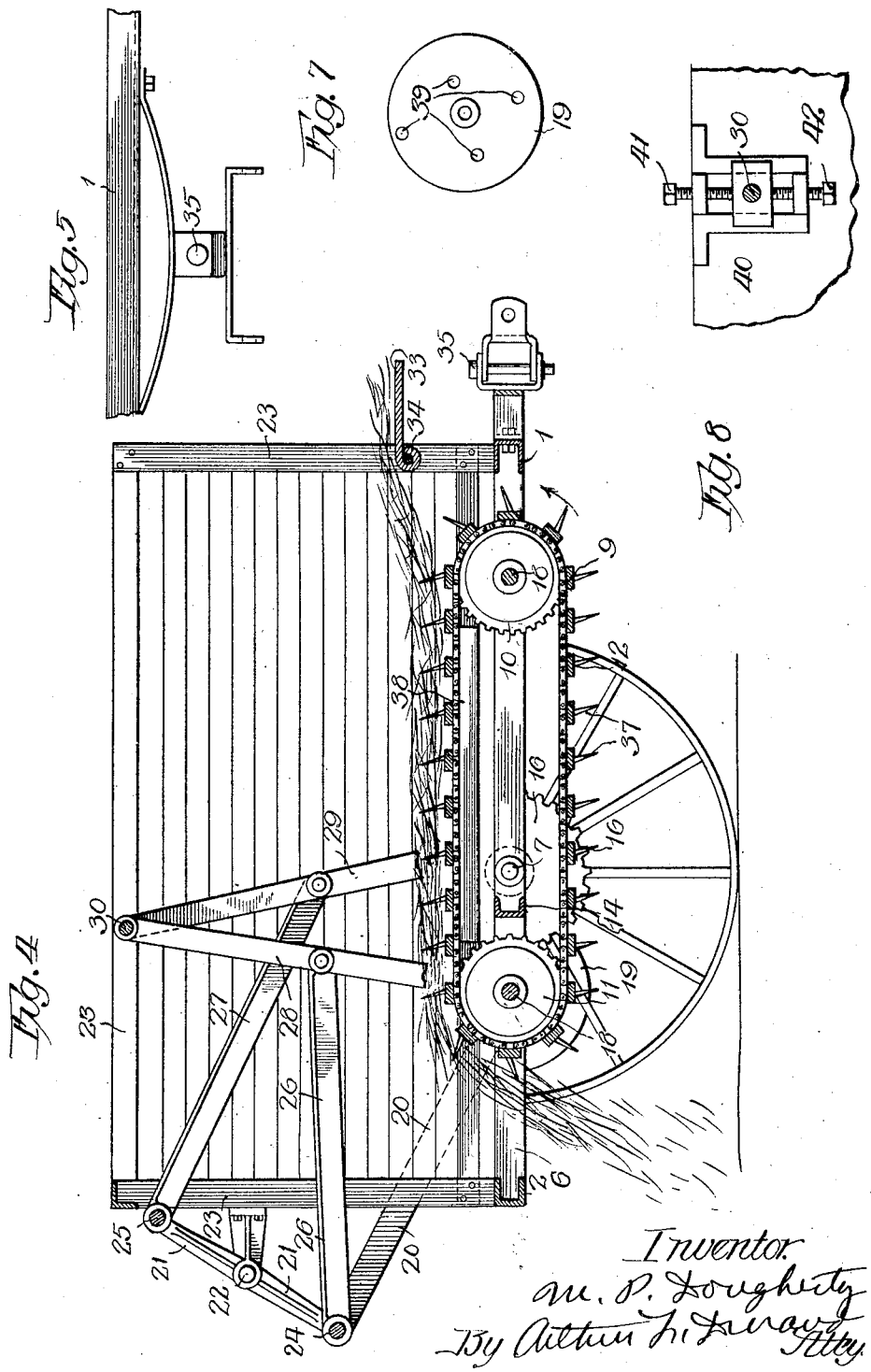

Patented Dec. 9, 1924.

1,518,573

UNITED STATES PATENT OFFICE.

MARTIN P. DOUGHERTY, OF CLINTON, ILLINOIS.

STRAW SPREADER.

Application filed May 5, 1922. Serial No. 558,820½.

*To all whom it may concern:*

Be it known that I, MARTIN P. DOUGHERTY, a citizen of the United States, and a resident of Clinton, De Witt County, Illinois, have invented a certain new and useful Improvement in Straw Spreaders, of which the following is a specification.

This application is a substitute for application Serial No. 385,149, in so far as the two applications contain common subject matter.

This invention relates to machines for spreading straw on the ground. This is done for various purposes, and it is desirable that the straw be spread in a uniform layer over the surface of the ground, as much as possible. Ordinarily, the straw is carried in a wagon, and is fed into the spreader which travels behind as a trailer. The invention relates more especially to this particular type of straw spreader.

Generally stated, the object of the invention is to provide an improved construction and arrangement involving novel and efficient means for feeding the straw from the rear end of the machine onto the ground in a satisfactory and effective manner.

Another object is to obviate the necessity of employing certain devices or features of construction heretofore considered necessary in machines of this character.

It is also an object to provide certain details and features of construction tending to increase the general efficiency and the desirability of a straw spreader of this particular construction.

To these and other useful ends the invention consists in matters hereinafter set forth and claimed, and shown in the accompanying drawings, in which—

Fig. 1 is a side elevation of a straw spreader in the form of a trailer embodying the principles of the invention, showing a portion of the near supporting wheel broken away for convenience of illustration, and showing a portion of the frame broken away to bring into view certain elements of the construction.

Fig. 2 is a plan of said machine.

Fig. 3 is a transverse vertical section on line 3—3 in Fig. 1.

Fig. 4 is a longitudinal vertical section on line 4—4 in Fig. 2.

Fig. 5 is a detail view of a portion of the draft connection.

Fig. 6 is a detail view showing the construction of one of the swinging kickers by which the straw is fed rearwardly and allowed to fall in the desired manner upon the ground.

Fig. 7 is a detail view of a crank plate.

Fig. 8 is a detail view showing a device to raise and lower the kickers.

As thus illustrated, the invention comprises a substantially rectangular body frame having transverse front and rear bars 1 and 2, or frame members, of any suitable character, and intermediate transverse frame members 3 and 4, together with longitudinal side members 5 and 6 at each side thereof, all forming a rigid frame. Transversely alined axles 7 are mounted in suitable bearings on the frame members 5 and 6, and provided with supporting wheels 8 which travel on the ground, to support the machine in a suitably elevated position. Sprocket chains 9 are mounted on sprocket wheels 10 and 11, the latter being in rear of axles 7, and the wheels 10 being suitably mounted near the front of the body frame. Transverse slats 12 connect the two sprocket chains together, and form a sort of carrying belt or apron to receive the straw from the wagon behind which the machine is trailed or drawn. The hubs of the wheels 8 are loose on the axles 7, and have clutch connections 13 with the two axles, each clutch being in the form of a ratchet having a spring-pressed member 14 yieldingly held against the toothed hub of the wheel by the spring 15, so that either wheel 8 can rotate backwards without rotating its axle, the member 14 being splined on the axle to slide away against the tension of the spring to allow the ratchet teeth to slide over each other without rotating the axle; but when the wheels 8 rotate forward, then both axles rotate to turn the gear wheels 16 which are rigid with the two axles, and which engage the pinions 17 carried on the shaft 18 upon which the sprockets 11 are mounted. Thus the belts 9 are driven in the direction indicated by the arrow in Fig. 4, so that the upper portion thereof travels rearward, and the lower portion forward. Crank plates 19 are mounted on the outer ends of the shaft 18, and are connected by links 20 with the walking beams or pivoted arms 21, which latter are pivoted at 22 on the sides of the machine, on the upper framework 23, thereby to vibrate in vertical parallel planes. Two transverse rods 24 and 25 connect the arms 21 together, and pitmen 26 and 27 have their rear ends mounted on said rods, respectively, and have their front ends connected to the swinging kickers or agitators 28 and 29, these kickers or agitators being hung from a transverse rod or shaft 30 supported at the top of said framework 23, so that these kickers or agitators all swing about the same transverse overhead axis. The lower ends of said kickers or agitators 28 and 29 come close to the slats 12, and serve as the means for feeding the straw along in the proper manner, the straw being prevented from leaving the rear end of the belt or apron in bunches or heaps, and being caused instead to escape downwardly in a practically flat layer of uniform thickness, so that the straw is spread in the desired manner upon the ground. Each kicker or agitator 28 or 29 is preferably constructed as shown in Fig. 6, being composed of two flat bars spaced apart at their upper ends to swing on the shaft or journal 30, a spreader 31 being interposed between the two flat bars to hold them in spaced relation, and the pitmen, 26 or 27, being interposed between the two flat bars near their lower ends, so that the latter are held close together, but preferably with some space between them, by the pivot bolt 32 by which each pitman is connected to its allotted kicker or agitator. In this way, the said kickers or agitators are free to swing back and forth in the desired manner, but are practically held against lateral displacement at their lower ends, by reason of their V-shape.

The side frames 23 are preferably boarded up or provided with sheet metal or other material to form side walls, thus forming a sort of hopper into which the straw is delivered from the wagon onto the traveling belt conveyor. A transversely arranged leaf 33 is pivoted at 34 between the two side frames over the front portion of the rectangular body frame, and preferably over the transverse bar or frame member 1, and when swung into a horizontal position, as shown, bridges the gap between the rear end of the wagon and the front end of the belt conveyor, or practically so, whereby the straw will not fall down between the wagon and the trailer.

A draft connection 35, of any suitable construction, is provided between the wagon and the front end of the body frame of the trailer, so that the latter can tilt sidewise relatively to the wagon, while the wagon and the machine are passing over uneven ground, and whereby the trailer can swing up and down relatively to the wagon. It will be understood that the wagon box or receptacle 36 which contains the straw can be of any suitable, known or approved character.

With the foregoing construction it will be seen that the straw will be carried along by the apron or endless belt formed by the sprocket chains 9 and the slats 12, the latter being preferably provided with teeth 37 which project upward into the straw to move the latter onward under the kickers or agitators 28 and 29, and the latter insure the desired discharge of the straw in a practically uniform thickness, or uniform depth, upon the surface of the ground. The rotary mechanism by which the kickers are operated, comprising the crank plates 19, is close to the axles and vehicle wheels of the trailer, so that the mechanism is advantageously operated by said wheels, and the power is transmitted through the pitmen 20 to the walking beams or rocker arms 22 and thus translated into an oscillatory motion, which latter movement is then transmitted through the reciprocating pitmen 26 and 27 to the swinging or vibratory kickers. Supports 38 are preferably provided to sustain the weight of the upper or forwardly moving portion of the endless belt or apron, so that the latter will not sag under the weight of the straw, these supports being attached to the body frame in any suitable or desired manner, extending longitudinally of the machine at opposite sides thereof. It will be seen that the alternate kickers 28 are connected to the pitmen 26, while the intermediate kickers 29 are connected to the pitmen 27, so that while the kickers 28 are moving toward the front end of the machine, the kickers 29 are moving toward the rear end thereof; and, vice versa, when the motion is reversed, the kickers 28 move or swing toward the rear end of the machine, while the kickers 29 are moving or swinging toward the front end of the machine; and, with this mode of operation, the lower ends of the kickers, which are preferably formed as shown, or in any suitable manner, tear and work the straw around in the desired manner, and allow the straw to escape from the rear end of the belt or conveyor in a more or less even or uniform layer or thickness, in the manner explained. Any suitable means can be provided, of course, for tightening the sprocket chains 9, whereby the conveyor belt will be kept in the proper condition.

In Fig. 7 the crank plate 19 is shown with several holes 39, each disposed a different distance from the axis of the plate, so that the throw is different when the pitman 20 is adjusted from one hole to another, thus changing the stroke of the kickers. The crank in one position determines the length of stroke of the kickers, and the extra holes 39 constitute the means for changing the length of said stroke of the kickers. Also, as shown in Fig. 8, the shaft 30 may be supported in bearings 40 which are adjustable up and down by means of screws 41, so that the kickers are raised and lowered without disturbing the adjustment of the length of stroke thereof. In this way the action of the kickers can be regulated in accordance with the requirements.

The actuating means formed by the frame or member composed of the arms 21, the shaft 22, and rods 24 and 25 are held against complete rotation about a horizontal axis, of course, by the pitmen 26 and 27, but are adapted to be partially rotated first in one direction and then in the other, by reverse rotation motion about said axis, and the extent of this motion serves to govern the length of the stroke of said kickers. The means which determine said length of stroke, however, are located between said frame or member and the vehicle wheels, and are preferably in the form of crank motion means or devices, such as the cranks 19 previously described, for with said frame or member free to oscillate either more or less, it is, of course, true that it is the length or throw of said crank (its length of stroke) that determines the length of the stroke to be given or imparted to the kickers, for the form and principle of said oscillating frame or member impose no restrictions (within limits) on the distance the kickers may swing, this being something that depends upon and is determined by the distance fixed or decided upon from 18 to the adjacent end of the pitman 19, which is the radius of the crank. Preferably, as explained, means are provided for changing this radius, and this may be done in any suitable manner. Obviously, the crank of one machine may have a single short radius, and the crank of another machine may have a single long radius, but otherwise the two machines will be exactly the same in size and construction and in each case the same frame or member (21, 22, 24 and 25) is employed, as it is not necessary to change this in any way when a different stroke is desired for the kickers of different machines. Also, as shown, the length of the stroke thus determined for the kickers of any particular machine may be, at the point of such determination, changed at will by providing the crank with more than one radius (see the holes 39) so that means of adjustment are provided to change from one radius to another on the same crank motion device. As stated though, and regardless of the method or expedient employed to determine the length of the stroke of the kickers, the form and size of the oscillating frame or member remain the same, so that identically the same oscillating actuating means can be used on machines each having a different length of stroke for the kickers, or on machines each having provisions for more than one length of stroke. Thus the oscillating means (21, 22, 24 and 25) are distinctly different from a rotating means which always rotates in the same direction, for in the former the degree of oscillation may be changed (either in the same machine or as between different machines) to give the kickers a different length of stroke, whereas with the latter (the continuously rotating means) the motion thereof cannot be changed, except to change the speed of rotation, and this would not change the length of stroke of the kickers.

With the construction shown and described, which is illustrative of the invention, the stroke of the kickers can be lengthened or shortened, according to the requirements, and each kicker is actuated by its own individual pitman; and one gang of kickers is actuated by connection to the top of the oscillatory member, and the other gang is actuated by the pitmen which extend to the bottom of said oscillatory member, and the said top and bottom never change places, the means providing the axes 24 and 25 practically having movement only horizontally, whereby the rod 25 always stays at the bottom; therefore, it is not only true that the kickers can be raised and lowered to suit the requirements, but can also be regulated to lengthen or shorten the stroke thereof.

Regardless of whether the feature of adjustment is employed, for changing the length of stroke of the kickers, it will be seen that whatever length of stroke is employed for the machine is determined at a point between the oscillatory member and the wheels of the vehicle, for the length of the crank at each side determines the degree of oscillation of the oscillatory member, and this in turn determines the length of stroke of the kickers, regardless of whether or not the feature of adjustment is employed for changing or varying the length of stroke of the kickers in one and the same machine.

What I claim as my invention is:

1. A straw spreader comprising oscillating actuating means disposed in position to oscillate alternately in opposite directions by reversal of rotation about a transverse axis, vehicle wheels, rotary mechanism operated by said wheels, means to convert the rotary motion of said mechanism into oscillatory motion on the part of said actuating means, adapted to determine the degree of partial rotation each time before reversal thereof, swinging kickers, reciprocating means to convert the oscillatory motion of said actuating means into swinging motion on the part of the kickers, serving by the degree of said oscillating motion to govern the length of the stroke of said kickers, and means to feed the straw below said kickers, said oscillatory means comprising arms connected together at their upper and lower ends by transverse members, each arm being pivotally supported between its ends, and said reciprocating means being connected to said transverse members.

2. A straw spreader comprising oscillating actuating means disposed in position to oscillate alternately in opposite directions by reversal of rotation about a transverse axis, vehicle wheels, rotary mechanism operated by said wheels, means to convert the rotary motion of said mechanism into oscillatory motion on the part of said actuating means, adapted to determine the degree of partial rotation each time before reversal thereof, swinging kickers, reciprocating means to convert the oscillatory motion of said actuating means into swinging motion on the part of the kickers, serving by the degree of said oscillating motion to govern the length of the stroke of said kickers, and means to feed the straw below said kickers, said mechanism comprising a plurality of cranks, said oscillatory means comprising a plurality of pivoted arms having upper and lower ends, each arm being supported between its ends, with transverse members connecting together the upper and lower ends of said arms, and said reciprocating means comprising pitmen which connect said transverse members with the kickers, with pitmen forming said rotary motion converting means for connecting said cranks with the lower end portions of said arms, whereby the latter are oscillated in unison about a transverse axis, and said kickers being so arranged that some of them move one way while the other kickers are moving in the opposite direction, as the result of the oscillatory motion of said pivoted arms.

3. A straw spreader comprising oscillating actuating means disposed in position to oscillate alternately in opposite directions by reversal of rotation about a transverse axis, vehicle wheels, rotary mechanism operated by said wheels, means to convert the rotary motion of said mechanism into oscillatory motion on the part of said actuating means, adapted to determine the degree of partial rotation each time before reversal thereof, swinging kickers, reciprocating means to convert the oscillatory motion of said actuating means into swinging motion on the part of the kickers, serving by the degree of said oscillating motion to govern the length of the stroke of said kickers, and means to feed the straw below said kickers, in combination with means to permit adjustment at a point between the oscillating means and the vehicle wheels to change the length of the stroke of said kickers.

4. A straw spreader comprising oscillating actuating means disposed in position to oscillate alternately in opposite directions by reversal of rotation about a transverse axis, vehicle wheels, rotary mechanism operated by said wheels, means to convert the rotary motion of said mechanism into oscillatory motion on the part of said actuating means, adapted to determine the degree of partial rotation each time before reversal thereof, swinging kickers, reciprocating means to convert the oscillatory motion of said actuating means into swinging motion on the part of the kickers, serving by the degree of said oscillating motion to govern the length of the stroke of said kickers, and means to feed the straw below said kickers, in combination with means to change the length of the stroke of said kickers, and means to raise and lower the kickers, without disturbing the adjustment for the length of stroke thereof.

5. In a spreading machine, the combination of swinging kickers, means to feed the materials under said kickers, a lower set of pitmen each connected to one of the alternate kickers, an upper set of pitmen each connected to one of the intermediate kickers, whereby each kicker has its individual pitman, actuating means below to actuate the lower set of pitmen, actuating means above to actuate the upper set of pitmen, so that one set and the kickers thereof move one way while the other set and the kickers thereof are moving in the opposite direction, adapted to maintain the one set always above the other, and operating means to determine the length of the stroke of said kickers and connected therefor to operate both of said actuating means.

6. A structure as specified in claim 5, said actuating means comprising upper and lower transverse rods upon which the ends of the pitmen are mounted, with the upper pitmen alternating with the lower pitmen when the machine is viewed from above, and supports therefor mounted to oscillate about a transverse axis disposed between said rods.

7. A structure as specified in claim 5, said operating means including a reciprocating member connected to the means for actuating said lower set of pitmen, and including also a device to actuate said member a distance to give the kickers the desired length of stroke.

8. A structure as specified in claim 5, said operating means including a crank at each side of the machine and a pitman connecting said crank with said actuating means.

9. A spreader comprising kickers and individual pitmen therefor, each kicker comprising a pair of bars clamping the pitman thereof between them, a pivotal connection between the pitman and said bars, a spacer between the upper end portions of said bars, so that the bars converge downward, means to pivotally support the separated upper ends of said bars, means to actuate said pitmen, and means to feed the materials below the lower ends of the kickers.

10. A structure as specified in claim 5, in combination with a support for the upper ends of said kickers, and instrumentalities to adjust said support up and down, and for changing the length of the stroke of said kickers in any raised or lowered position thereof.

11. A structure as specified in claim 5, in combination with means to change the length of the stroke of said oscillating means, to either shorten or lengthen the stroke thereof thereby to change the stroke of said kickers.

12. In a spreading machine, the combination of means for feeding the materials, swinging kickers disposed over said feeding means, operating mechanism to swing some of the kickers in one direction while the other kickers are swinging in the opposite direction, and means of adjustment for said mechanism to lengthen or shorten the stroke of the kickers.

13. In a spreader, the combination of swinging kickers, means to support the materials below the lower ends of said kickers, actuating means held against complete rotation about a horizontal axis and having only partial rotation alternately in one direction and then in the other about said axis to actuate said kickers, so that the length of the stroke of said kickers is governed by the degree of rotation imparted to said actuating means, and means to determine the stroke of the kickers and connected therefor to said actuating means.

14. A structure as specified in claim 13, having also means whereby the length of the stroke of said kickers may be changed by merely imparting to said actuating means either a greater or a less degree of partial rotation.

15. A structure as specified in claim 13, having vehicle wheels which provide the power to operate said kickers and between which and said actuating means is located a crank motion device forming said means that determine the length of the stroke of the kickers.

16. In a traveling spreader, the combination of swinging kickers, means for feeding the materials below the lower ends of said kickers, oscillatory mechanism connected to operate said kickers and instrumentalities for causing the predetermined degree of oscillation necessary for said mechanism to give said kickers the desired length of stroke, said instrumentalities having provisions for changing said predetermined degree of oscillation to thereby change the length of stroke of the kickers.

MARTIN P. DOUGHERTY.